United States Patent [19]

Buhler

[11] Patent Number: 4,848,383
[45] Date of Patent: Jul. 18, 1989

[54] MULTI CAR GARAGE ADAPTED VEHICLE WASHING APPARATUS

[76] Inventor: Charles Buhler, Peaceable Hill Rd., Brewster, N.Y. 10509

[21] Appl. No.: 198,066

[22] Filed: May 24, 1988

[51] Int. Cl.⁴ ............................................... B60S 3/04
[52] U.S. Cl. .................................... 134/123; 134/199; 239/587
[58] Field of Search ........................ 34/93, 95, 100, 45, 34/123, 144, 145, 172, 180, 181, 199; 239/587; 15/DIG. 2; 137/615

[56] References Cited

U.S. PATENT DOCUMENTS

| | | | |
|---|---|---|---|
| 3,368,571 | 2/1968 | Honorof | 134/123 X |
| 3,724,472 | 4/1973 | Jenkins et al. | 134/123 X |
| 3,736,948 | 6/1973 | Crosswhite | 134/123 X |
| 4,452,263 | 6/1984 | McClure | 134/45 |

FOREIGN PATENT DOCUMENTS 251427  5/1964  Australia ............................ 134/123

Primary Examiner—Philip R. Coe
Attorney, Agent, or Firm—Jordan B. Bierman

[57] ABSTRACT

A vehicle washing apparatus specifically adapted to be mounted within or adjacent to the door frame of a garage having an uninterrupted multi vehicle width door. The apparatus has an outer liquid transport loop having supply lines and a section equipped with a plurality of spray nozzles. The section of the loop equipped with spray nozzles has at least one centrally disposed extension portion movably adjusted to pivot downward while the apparatus is in use, and allowing the use of additional spray nozzles. When the apparatus is not in use, the extension pivots upwards and out of the way of vehicles moving into and out of the garage.

11 Claims, 3 Drawing Sheets

MULTI CAR GARAGE ADAPTED VEHICLE WASHING APPARATUS

FIELD OF THE INVENTION

The present invention relates to a vehicle washing apparatus and, more particularly, to an improved apparatus adapted for use in a garage with an uninterrupted multi vehicle door width.

DESCRIPTION OF THE PRIOR ART

Vehicle washing apparatuses using spray nozzles have heretofore been well known in the field. When adapted for use in a multi vehicle garage, the typical prior art apparatus comprised either a liquid transport loop adapted to be fixed to the inner surface of the outer wall of the garage, or a liquid transport loop supplied with centrally located fixed extension portions. These prior art vehicle washing systems have, however, been found to be deficient when adapted for use in garages having multi vehicle width doors. In the first type comprising only an outer loop, the distance between the spray nozzles and at least one side of the vehicle being washed is excessively large, either necessitating the use of excessive water pressure, or causing one side of the vehicle to be insufficiently contacted by the washing liquid. The second type, comprising an outer loop and centrally fixed extensions, while solving the above-described deficiencies, was susceptible to damage by incidental contact with vehicles during parking, and limited the size of the vehicles being parked.

SUMMARY OF THE PRESENT INVENTION

It is, therefore, an object of the present invention to provide a vehicle washing apparatus adaptable for use in a garage having an uninterrupted multi vehicle width door, said apparatus being disposed within or adjacent to the door frame of the garage, and being able to ensure sufficient contact between the washing liquid and the vehicle being washed and further being capable of movement to a position out of the way of vehicles; thereby preventing damage resulting from accidental contact with a vehicle when the apparatus is not in use.

These and other various objects and advantages of the present invention will become more fully apparent as the following description is read in conjunction with the accompanying drawings.

DETAILED DESCRIPTION OF THE INVENTION

Figure 1:
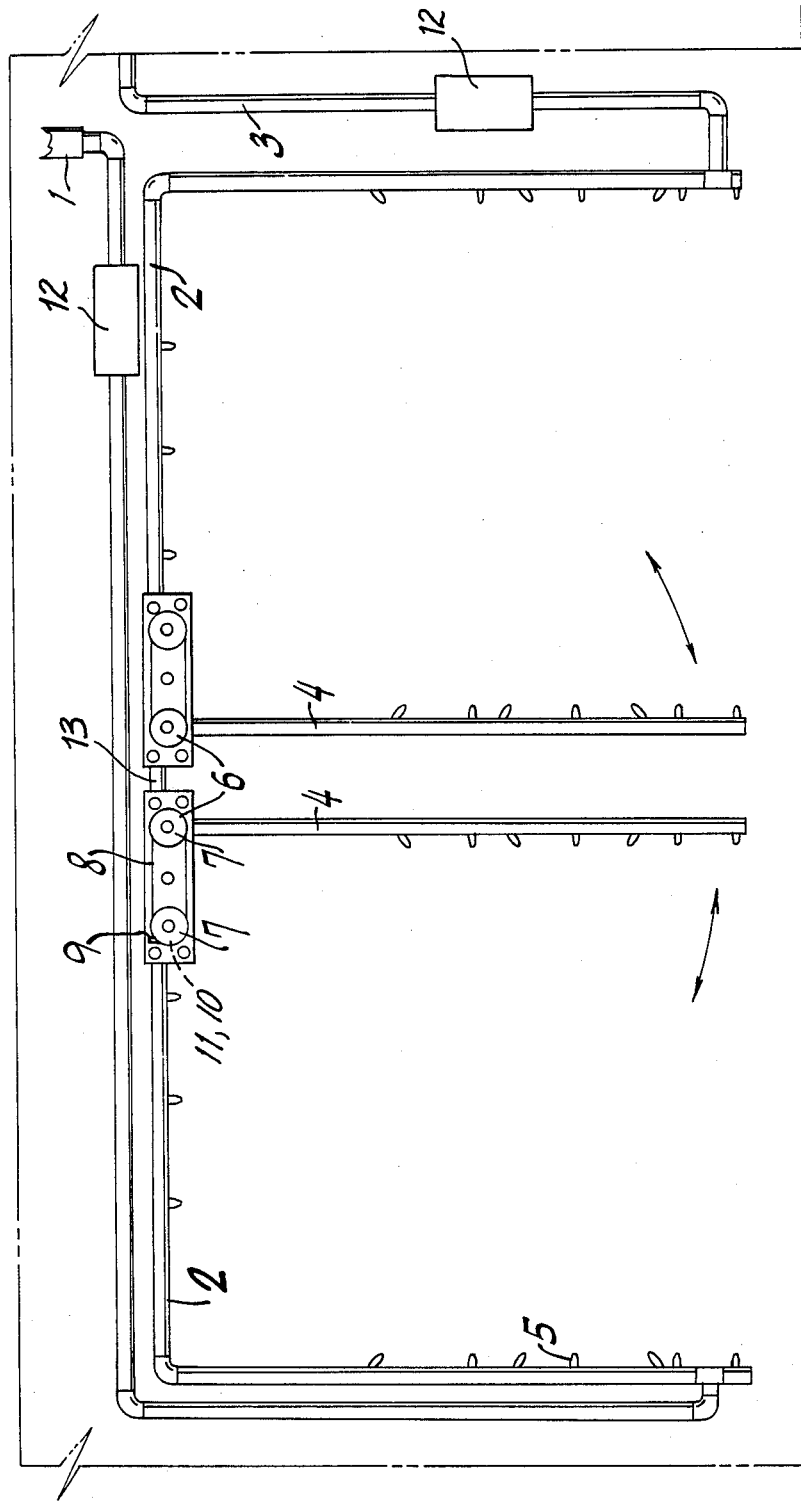
FIG. 1 is a front view of the vehicle washing apparatus with the extension pieces lowered for use.
Figure 2:
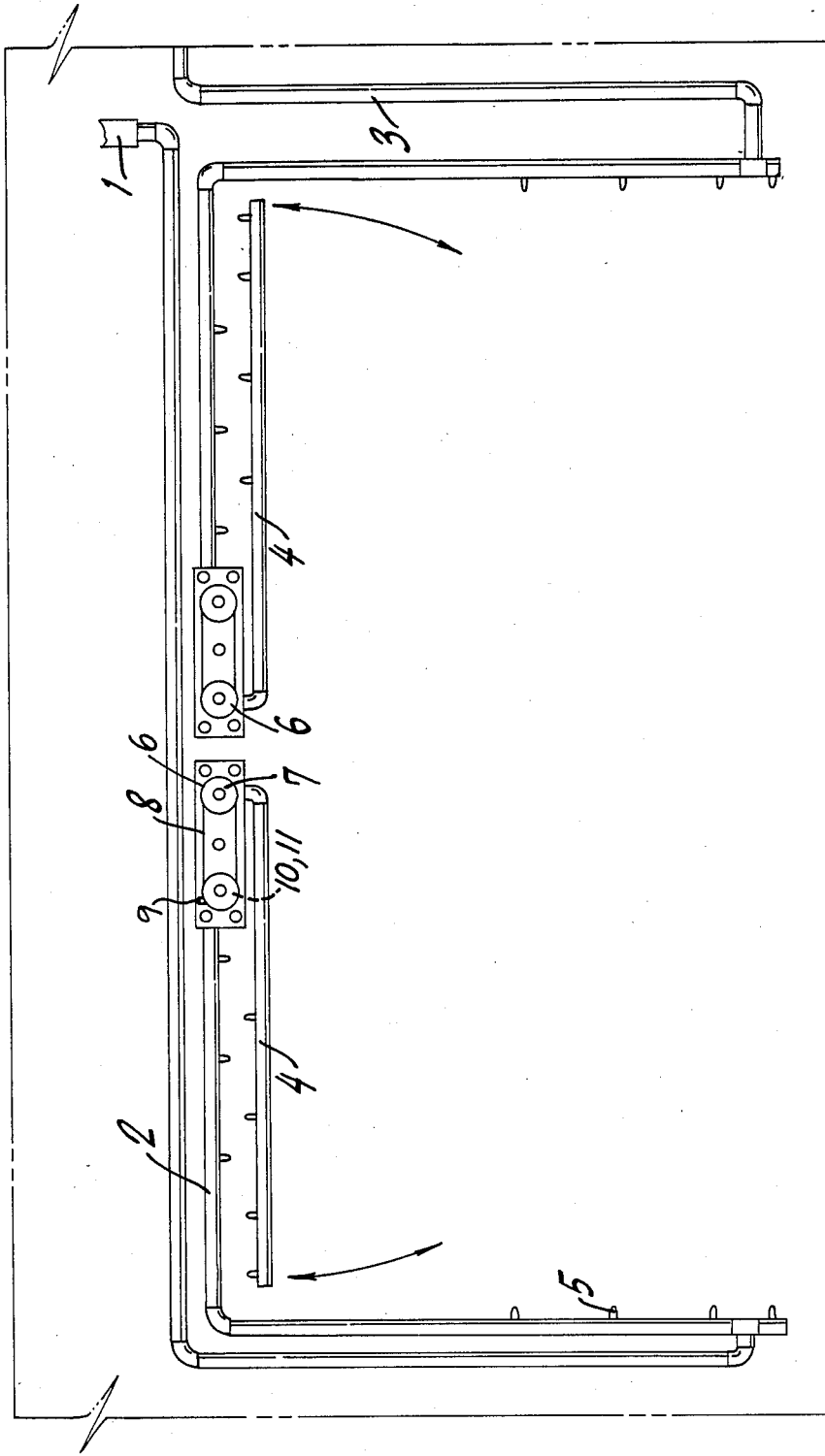
FIG. 2 is a front view of the vehicle washing apparatus with the extension pieces raised for storage.
Figure 3:
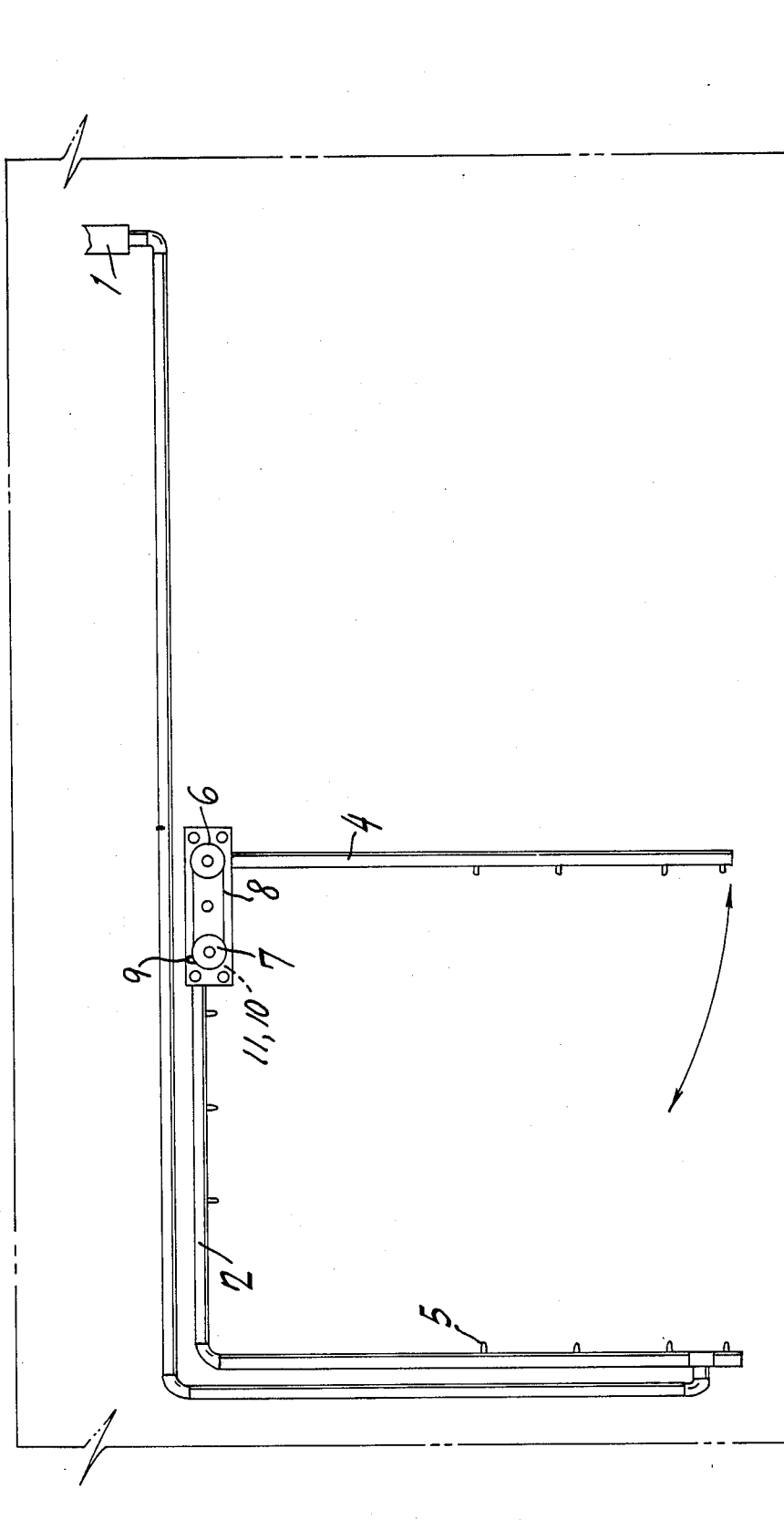
FIG. 3 is a side view of a second embodiment wherein the apparatus is deployed in only a portion of the garage.

The vehicle washing apparatuses of FIGS. 1, 2, and 3 comprise an outer liquid transport loop including supply lines 1 and 3, and central portion 2 disposed therebetween. This loop is adapted to be mounted within or adjacent a multi vehicle width door frame of a garage. At least one extension 4 is centrally disposed within central portion 2 of the liquid transport loop. Extension 4 and central portion 2 are equipped with a plurality of spray nozzles 5 which may be positioned at a plurality of incidental angles.

Extension 4 is pivotably attached to central portion 2 by a pivotable fixture 6. Extension 4 can be raised and lowered manually or, preferably, by a driving mechanism comprising motor 10, gears 7 and driving chains 8. Extension 4 can be pivoted upward either parallel or perpendicular to the upper central portion of the liquid transport loop. When the driving mechanism is employed, overtravel is prevented by limiting switch 9. Additionally, the motor can be equipped with safety clutch 11 to prevent damage to the mechanism if movement of extension 4 is impeded or blocked.

FIG. 1 illustrates the apparatus with extension 4 lowered. In this position, the apparatus is ready for use. FIG. 2 illustrates the apparatus in its storage position with the extension safely raised to a level above the roof line of a vehicle using the garage. FIG. 3 illustrates an alternative embodiment wherein the liquid transport loop is disposed about only a portion of the garage door width. Additional features foreseen by the Applicant include, but are not limited to, a system for metering and injecting detergent 12 into the liquid transport loop, and a remote control device 13 for the remote operation of the driving mechanism motor 10.

In operation, extension 4 is lowered, either manually or by the driving means, and water and/or detergent flow is begun. A vehicle (not shown) is driven through the liquid transport loop wherein water from the spray nozzles 5 contacts and subsequently washes the vehicle. After the vehicle has passed through the door, the water flow is halted, and extension 4 is raised to its storage position.

While preferred embodiments have been shown and described, the various modifications and substitutions may be made thereto without departing from the spirit and scope of the invention. Accordingly, it will be understood that the present invention is not to be limited except by the character of the claims appended hereto.

I claim:

1. A vehicle washing apparatus adapted for use in a multivehicle width garage wherein at least two vehicles can be parked, each of said vehicles having a driver's side wall, a passenger side wall, and roof, said apparatus comprising liquid supply lines and a liquid transport loop, said transport loop comprising first and second vertical sections disposed substantially vertically and adjacent to the driver's side wall of the first vehicle and the passenger side of the second vehicle, respectively, and a horizontal section disposed substantially horizontally and adjacent to the roof of said vehicles;

said loop being equipped with a plurality of spray nozzles for spraying liquid on said roofs, said driver's side wall of said first vehicle and said passenger side wall of said second vehicle, said apparatus further comprising;

at least one extension disposed centrally between said vertical portions and said first and second vehicle, said extension having additional nozzles for spraying the passenger side of said first vehicle and the driver's side of said second vehicle;

said extension being adapted to pivot upward around an attachment point when said apparatus is not in use.

2. The apparatus of claim 1 having two extensions.

3. The apparatus of claim 1 wherein said extension pivots upwardly to a position substantially parallel to the horizontal section of said loop.

4. The apparatus of claim 1 where said extension pivots upwardly to a position substantially perpendicular to the horizontal section of said loop.

5. The apparatus of claim 1 further comprising at least one motor and driving mechanism, said motor and driving mechanism powering upward and downward movement of said extension.

6. The apparatus of claim 5 wherein the movement of said extension is limited by limiting means.

7. The apparatus of claim 5 further comprising a clutch adapted to disengage if movement of said extension is blocked or impeded.

8. The apparatus of claim 5 wherein said motor and driving mechanism are controlled by remote control means.

9. The apparatus of claim 1 wherein the plurality of spray nozzles are positioned at different incidental angles.

10. The apparatus of claim 1 further comprising a detergent supply and metering means for injecting detergent into said liquid transport loop.

11. A vehicle washing apparatus adapted for use in a multivehicle width garage in which at least two vehicles can be parked, each of said vehicles having a first and second side wall, and roof, said apparatus comprising liquid supply lines and a liquid transport loop, said transport loop comprising a vertical section disposed substantially vertically and adjacent to the first side wall of the first vehicle and a horizontal section disposed substantially horizontally and adjacent to the roof of said first vehicle;

said loop being equipped with a plurality of spray nozzles for spraying liquid on the roof and first side wall of said first vehicle, said apparatus further comprising;

at least one extension disposed at an end of said horizontal section opposite said vertical section and centrally located between the first and second vehicle, said extension having additional nozzles for spraying the second side wall of said first vehicle;

said extension being adapted to pivot upward around an attachment point when said apparatus is not in use.

* * * * *